(12) United States Patent
Janisch, Jr. et al.

(10) Patent No.: US 6,832,882 B2
(45) Date of Patent: Dec. 21, 2004

(54) FASTENER

(75) Inventors: Joseph J. Janisch, Jr., Roselle, IL (US); Michael F. Brletich, Lake Forest, IL (US)

(73) Assignee: Illinois Tool Works Inc., Glenview, IL (US)

( * ) Notice: Subject to any disclaimer, the term of this patent is extended or adjusted under 35 U.S.C. 154(b) by 4 days.

(21) Appl. No.: 10/154,900

(22) Filed: May 24, 2002

(65) Prior Publication Data

US 2003/0068213 A1 Apr. 10, 2003

Related U.S. Application Data

(60) Provisional application No. 60/327,522, filed on Oct. 5, 2001.

(51) Int. Cl.[7] .............................................. F16B 37/08
(52) U.S. Cl. ...................... 411/433; 411/435; 411/437; 411/412; 411/907; 411/366.3
(58) Field of Search .......................... 411/366.1, 366.3, 411/433, 435, 437, 412, 525–528, 904, 907, 908, 512, 2

(56) References Cited

U.S. PATENT DOCUMENTS

| | | | |
|---|---|---|---|
| 23,409 A | * 3/1859 | Thom ........................ 411/411 |
| 1,069,451 A | * 8/1913 | Marston ..................... 411/437 |
| 3,918,208 A | 11/1975 | Fairchild |
| 4,006,660 A | 2/1977 | Yamamoto et al. |
| 4,299,520 A | * 11/1981 | Iwata ......................... 411/437 |
| 4,389,145 A | 6/1983 | Capuano |
| 4,416,574 A | 11/1983 | Klimowicz |
| 4,609,317 A | 9/1986 | Dixon et al. |
| 4,846,611 A | 7/1989 | Sadri et al. |
| 4,899,431 A | 2/1990 | Borntrager |
| 4,934,859 A | 6/1990 | Dixon et al. |
| 4,983,085 A | 1/1991 | Gray |
| 4,990,043 A | 2/1991 | Hafeli et al. |
| 5,033,339 A | 7/1991 | Parker |
| 5,098,242 A | * 3/1992 | Schaty ........................ 411/437 |
| 5,279,190 A | 1/1994 | Goss et al. |
| 5,358,367 A | 10/1994 | Yang |
| 5,513,933 A | 5/1996 | Rom |
| 5,685,663 A | 11/1997 | Sadri |
| 5,906,464 A | * 5/1999 | Wedenig ..................... 411/433 |
| 5,931,621 A | 8/1999 | Griffith et al. |
| 5,947,671 A | * 9/1999 | Kanaan et al. .............. 411/435 |
| 6,196,781 B1 | 3/2001 | Yang |
| 6,233,802 B1 | 5/2001 | Fulbright |
| 6,347,435 B1 | * 2/2002 | Davignon et al. ........ 24/16 PB |

* cited by examiner

*Primary Examiner*—Flemming Saether
(74) *Attorney, Agent, or Firm*—Mark W. Croll; Paul F. Donovan

(57) ABSTRACT

A ratcheting fastener system such as for point of purchase displays. A bolt has a shank with a head end and a distal end, and a plurality of bolt threads on the shank, each thread having a thread start at the distal end. A nut has a bore with a plurality of thread segments in the bore adapted for engaging the bolt threads when axial force is applied to the bolt with the distal end inserted in the nut. Deflection of the nut thread segments occurs in controlled locations. The bolt and nut can be formed as a single unit connected by a frangible link.

6 Claims, 2 Drawing Sheets

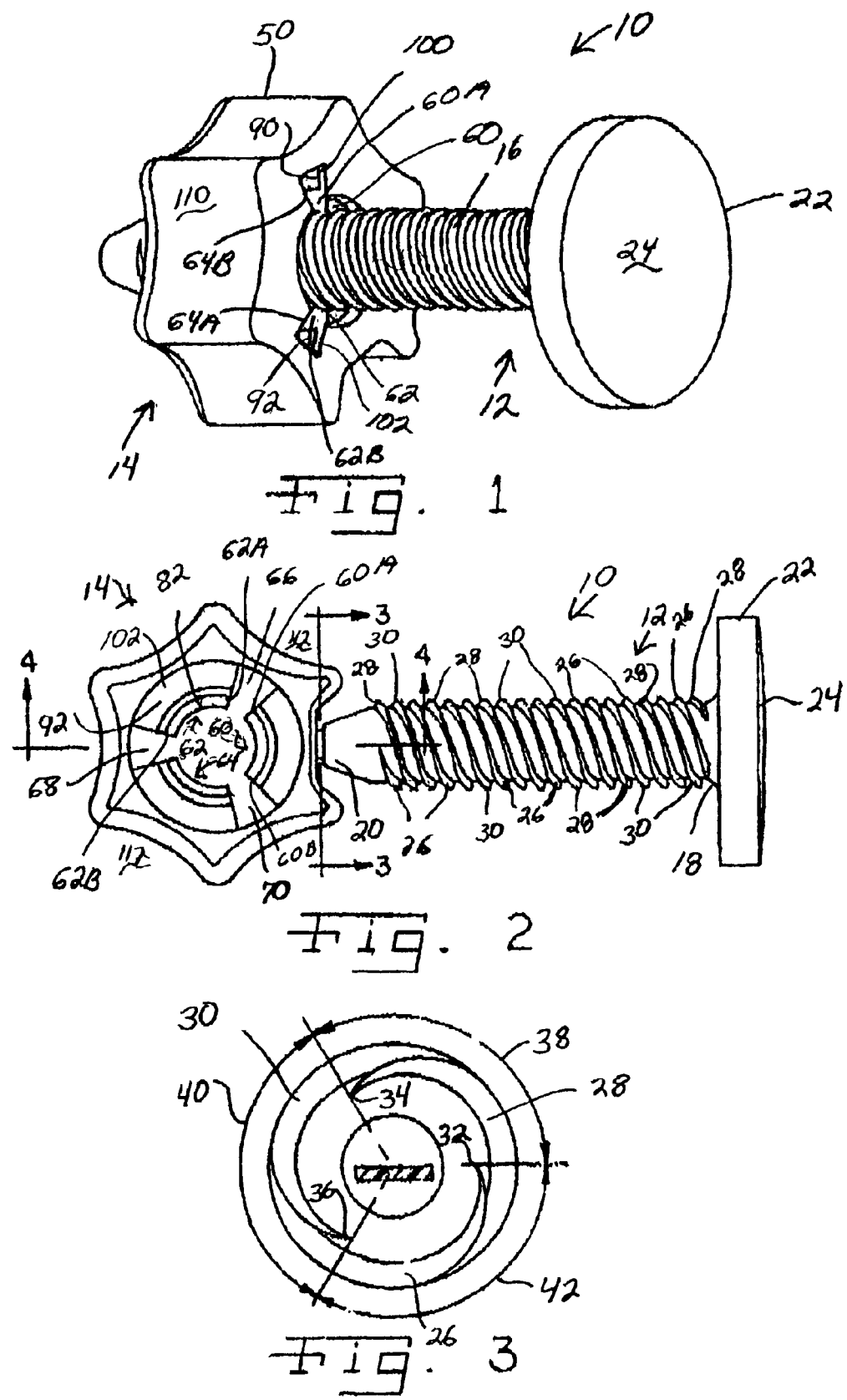

FASTENER

This application claims the benefit of U.S. provisional application No. 60/327,522 filed Oct. 5, 2001.

FIELD OF THE INVENTION

The present invention pertains generally to threaded fastening systems including a threaded male pin and a female threaded nut. More particularly, the invention pertains to ratcheting fastener systems in which a threaded male pin can be engaged with a threaded female nut by placing a distal end of the pin in the nut and applying axial force to the pin. The invention also pertains to methods of making threaded pins and nuts.

BACKGROUND OF THE INVENTION

Specialized threaded fasteners are provided for many different uses. In a fastener system often referred to as a ratcheting fastener, a threaded nut and a threaded pin or bolt are adapted to be pushed together for engagement, and rotated as a conventional nut and bolt for disengagement. A ratcheting fastener also can be rotated for engagement, but should resist disengagement from pulling the nut and bolt in opposite directions. Ratcheting fasteners are used on point of purchase displays, and other situations in which relatively rapid setup is desired, and the use of tools is inconvenient. Ratcheting fasteners are also useful and particularly advantageous for attaching components of different thicknesses. A relatively long bolt can be used for attaching both thick and thin components to a display structure by inserting the bolt from the front and pushing the nut onto the bolt from the back. The structures and items being held are wedged snuggly between the head of the bolt and the nut, regardless of thickness so long as the bolt extends completely therethrough with sufficient threads exposed to receive the nut. Commonly, ratcheting fasteners are provided of plastic material, are easy to use and inexpensive.

Known ratcheting fasteners have certain inadequacies and deficiencies. Preferably, the force required to push the nut onto the threaded bolt is substantially less than the pulling force that could result in dislodgement of the nut from the bolt, or failure of the nut or bolt. In practice and design, such features have been difficult to accomplish. If designed and provided for easy "push-on" of the nut onto the bolt, the "pull-off" force is also lessened. Thus, a ratcheting fastener provided for easy push-on often can not be used for securing heavy displays and/or bulky items. Conversely, if the ratcheting fastener is designed for increased "pull-off" resistance, the "push-on" force required during set-up can make fastening difficult.

Other problems also have been experienced with ratcheting fasteners of known designs. For example, during push-on of the nut, threads in the nut have been broken and/or threads on the bolt have been damaged. In either case, the utility of the fastener is diminished, and disengagement by unscrewing can be made difficult. Further, cross-threading between the nut and bolt can occur, making further engagement or disengagement difficult. Correction of the cross-threading condition often has resulted in thread damage. Additionally, while a low pitch angle for the threads is desirable for fastening, a high pitch angle is desirable for more rapid disassembly. With a high pitch angle, fewer turns are required for removing the nut from the bolt. However, a high pitch angle can result in a loose or sloppy engagement between the nut and the bolt.

What is needed in the art is a ratcheting type fastener system that has a reduced push-on force requirement, with an increased pull-off force resistance, and that resists cross threading and provides rapid disengagement or unscrewing of the nut component from the bolt component thereof.

SUMMARY OF THE INVENTION

The present invention provides a ratcheting fastener system including a threaded bolt and a threaded nut received thereon. The bolt and nut are designed for controlled thread deflection to decrease the force required for pushing the nut onto the bolt while retaining a larger force requirement for pulling the nut from the bolt.

The invention provides, in one form thereof, a ratcheting fastener system with a bolt and a nut. The bolt has a shank with a head end and a distal end. A plurality of bolt threads is provided on the shank, each thread having a thread start at the distal end. A nut has a bore, with a plurality of threads in the bore adapted for engaging the bolt threads when axial force is applied to the bolt with the distal end inserted in the nut.

The invention provides, in another form thereof, a nut for a threaded fastener. A nut body has an axial bore and a plurality of thread segments disposed in the axial bore. Each thread segment extends a distance less than a circumference of the axial bore, and has first and second thread segment ends. Ends of adjacent thread segments are spaced from each other in a circumferential direction of the bore. Each thread segment has a thread face and an undercut behind the thread face for providing controlled deflection of the threads.

In a further form thereof, the invention provides a bolt with a shank having a head end and a distal end; a head disposed on the shank at the head end; and a plurality of threads on the shank, each thread having a thread start at the distal end.

In still another form thereof, the invention provides a method of making a fastener, the method having steps of providing a mold having a bolt forming cavity, a nut forming cavity and a connecting link cavity in communication with the bolt forming cavity and the nut forming cavity; and forming a nut and a bolt in the mold, with a frangible link connecting the nut to the bolt. The bolt is formed with a shank having a head end and a distal end, a head on the head end and a plurality of individual threads on the shank each having a thread start at the distal end. The nut is formed with a bore and a plurality of thread segments of substantially equal length and evenly spaced around the bore.

An advantage of the present invention is providing a ratcheting nut and bolt fastener in which the nut can be pushed onto the bolt with a decreased force requirement, while the force required for pulling the nut off the bolt remains high.

Another advantage of the present invention is providing a ratcheting-type fastener with a reduced incidence of thread breaking or thread stripping on either the nut or the bolt.

Yet another advantage of the present invention is providing a ratcheting-type fastener that self-adjusts from a cross-thread condition upon a partial turn of the nut relative to the bolt.

A further advantage of the present invention is providing a ratcheting-type fastener in which the nut fits tightly on the bolt, yet can be removed therefrom with only a few revolutions of the nut on the bolt.

A still further advantage of the present invention is providing a nut and bolt ratcheting fastener manufactured as a single integral component, with the nut and bolt formed of molded plastic and interconnected by a frangible link.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a perspective view of a ratcheting-type fastener in accordance with the present invention, the figure illustrating the nut in position on the bolt of the fastener;

FIG. 2 is a plan view of the ratcheting fastener as manufactured with the nut attached to the bolt;

FIG. 3 is a cross-sectional view of the ratcheting-type fastener shown in FIG. 2, taken on line 3—3 of FIG. 2;

Figure 4:
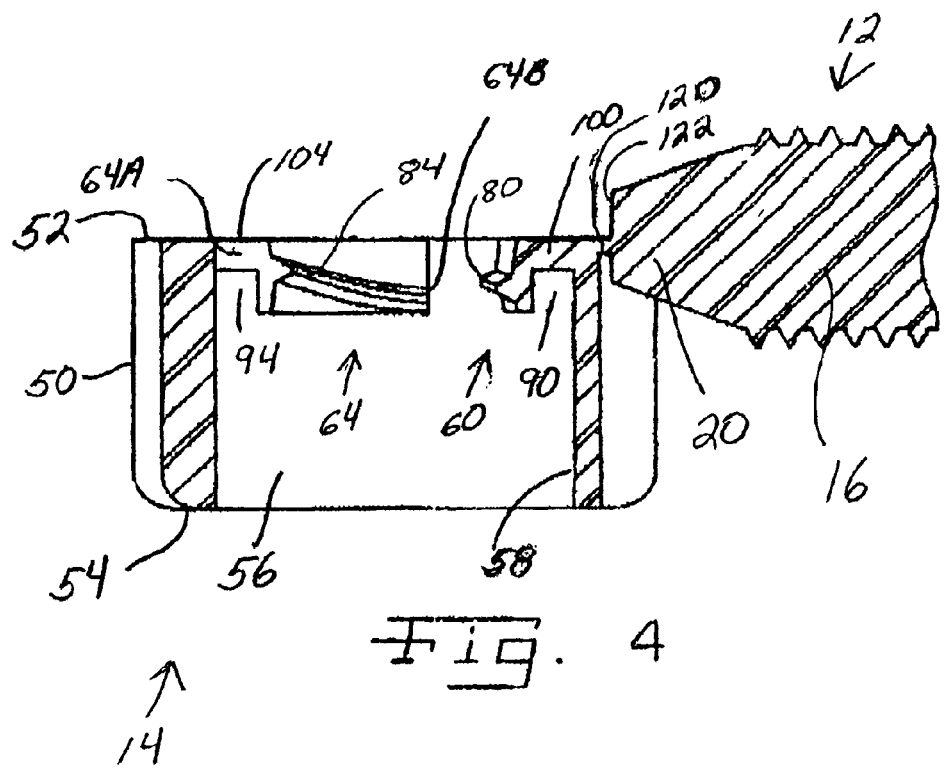
FIG. 4 is a cross-sectional view of the ratcheting-type fastener shown in FIG. 2, taken along line 4—4 of FIG. 2.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof, as well as additional items and equivalents thereof.

DETAILED DESCRIPTION OF THE PREFERRED EMBODIMENT

Referring now more specifically to the drawings, and to FIG. 1 in particular, numeral 10 designates a ratcheting fastener of the present invention. Fastener 10 includes a bolt 12 and a nut 14. Advantageously, bolt 12 and nut 14 are formed of injection molded plastic, as will be described in greater detail hereinafter.

Bolt 12 includes a shank 16 having a head end 18 and a distal end 20. Distal end 20 is tapered to provide a self-centering feature as bolt 12 and nut 14 are brought into operative position as shown in FIG. 1.

A head 22 is provided on head end 18 of shank 16. Head 22, as illustrated, is substantially round and has a flat though slightly curved top surface 24. It should be recognized that in some applications and uses for fastener 10, it may be advantageous to shape and define head 22 such that tools can be used for grasping and holding or rotating bolt 12. Thus, head 22 can be provided with the slots (not shown) in surface 24 for straight blade screwdrivers, Phillips head screwdrivers, Torx drivers, hex drivers or the like. As further alternatives, head 22 can be of a shape other than the substantially round shape shown, and may be shaped such that conventional tools such as box or open end wrenches can be used for grasping head 22. However, it is anticipated that many advantageous uses of fastener 10 can be provide with the substantially round and smooth head 22 as shown, providing a somewhat decorative and/or inconspicuous visual appearance for the fastener on a point of purchase display type application.

Shank 16 is provided with a plurality of threads 26, 28, and 30 extending substantially from distal end 20 to head end 18 along shank 16. As illustrated, bolt 12 includes three threads 26, 28 and 30 provided on shank 16, but may include more or fewer than three threads. Each of threads 26, 28 and 30 includes a thread start 32, 34 and 36, respectively, at distal end 20 of shank 16. Thread starts 32, 34 and 36 are evenly spaced about shank 16 such that, as illustrated in FIG. 3, each is spaced from the other by 120°, as indicated by the equal length arrowed curved lines 38, 40 and 42 indicating the arcs of the circumference of shank 16 defined between edges of thread starts 32, 34 and 36.

It should be understood that shank 16 can be provided of different lengths and widths as required for the particular application and use of fastener 10. When thin items are to be attached to a relatively thin structure, shank 16 need not be of great length. However, if relatively thicker items are to be attached to a relatively thicker object, a longer shank 16 may be required. Similarly, the thickness of shank 16 can be selected for the specific physical characteristics desired.

Further, threads 26, 28 and 30 are shown extending substantially the full length of shank 16, each terminating near head 22. However, it should be recognized that threads 26, 28 and 30 may be provided for only a portion of the length of shank 16, and may terminate a relatively significant distance short of head 22 if fastener 10 is to be used with relatively thick objects.

Bolt 12, including shank 16, head 22 and threads 26, 28 and 30 is provided advantageously as a single, integral unit formed by injection molding of plastic or the like.

Nut 14 includes a nut body 50 having first and second axial ends 52 and 54, respectively. An axial bore 56 extends through nut body 50, and has bore openings in axial ends 52 and 54. Axial bore 56 is defined by a bore wall 58 (FIG. 4). A plurality of thread segments 60, 62 and 64 (FIG. 2) are provided in axial bore 56 on bore wall 58, and in the embodiment illustrated three thread segments 60, 62 and 64 are provided. Each thread segment 60, 62 and 64 includes first and second ends A and B, respectively. Thus, as seen in FIGS. 2 and 4, thread segment 60 includes first and second ends 60A and 60B, respectively; thread segment 62 includes first and second thread segment ends 62A and 62B, respectively; and thread segment 64 includes first and second thread segment ends 64A and 64B, respectively. Each thread segment 60, 62 and 64 extends only partially around the circumference of axial bore 56. Each thread segment end A and B is spaced from the adjacent thread segment end B or A, respectively, of the adjacent thread segment 60, 62 or 64. Thus, a space 66 is defined between thread segments 60 and 62, a space 68 is defined between thread segments 62 and 64, and a space 70 is defined between thread segments 64 and 60.

Thread segments 60, 62 and 64 can be provided at any location along the axial length of axial bore 56; however, advantageously, thread segments 60, 62 and 64 are provided nearer one axial end 52 or 54 than the other axial end 52 or 54. In the embodiment illustrated, thread segments 60, 62 and 64 are disposed in axial bore 56 nearest axial end 52.

Each thread segment 60, 62 and 64 includes a thread face 80, 82 and 84, respectively. Each is further provided with an undercut 90, 92 and 94, respectively. As seen most clearly in FIG. 4 with respect to thread segments 60, 62 and 64, undercuts 90, 92 and 94 are provided behind a portion of thread faces 80, 82 and 84, respectively, and each thread segment face 80, 82 and 84 is thereby connected to bore wall 58 by a thinned connection strip 100, 102 and 104, respectively. Thus, each connection strip 100, 102 and 104 is thinner in a dimension defined by the axial length of nut 14 between axial ends 52 and 54 than are thread faces 80, 82 and 84. Thinned connection strips 100, 102 and 104 allow localized deflection of thread segments 60, 62 and 64 as bolt 12 and nut 14 are connected, as will be described in greater detail hereinafter.

As illustrated most clearly in FIG. 4, nut 14 includes only a single layer of threads in the axial direction of bore 56, and each thread is a segment extending only partially around the circumference of axial bore 56. Nut 14 is provided with a plurality of thread segments 60, 62 and 64 equal to the plurality of bolt threads 26, 28 and 30 provided on shank 16. Thus, as illustrated, when three bolt threads 26, 28 and 30 are provided, three thread segments 60, 62 and 64 are provided in axial bore 56 of nut body 50, with the thread segments equally spaced around the circumference of bore 56.

Nut body 50 includes an outer surface 110 that may embody a variety of different configurations. Advantageously, as illustrated in the drawings, outer surface 110 is provided with a plurality of scallops 112 formed therein for providing a readily graspable surfaces. Alternatively, as those skilled in the art will understand, outer surface 110 may take the configuration of wings (not shown) commonly found on wing nuts, or outer surface 110 may be shaped for engagement with tools. Thus, outer surface 110 may be provided with flat surfaces for receiving a wrench or the like.

Nut body 50, and particularly thread segments 60, 62 and 64, are provided in an appropriate diameter axial bore 56 for receiving bolt 12 therein, and specifically for providing threaded fastener type engagement between bolt threads 26, 28 and 30 and thread segments 60, 62 and 64.

Advantageously, nut 14 is also formed of injection molded plastic of the same material makeup as bolt 12. Further advantageously, bolt 12 and nut 14 are formed as a single integral, but readily separable unit. Thus, bolt 12 and nut 14 are connected to each other by a frangible connecting link 120. Frangible link 120 is connected to a tip surface 122 of distal end 20 of bolt 12 and to outer surface 110 of nut body 50.

Figure 5:
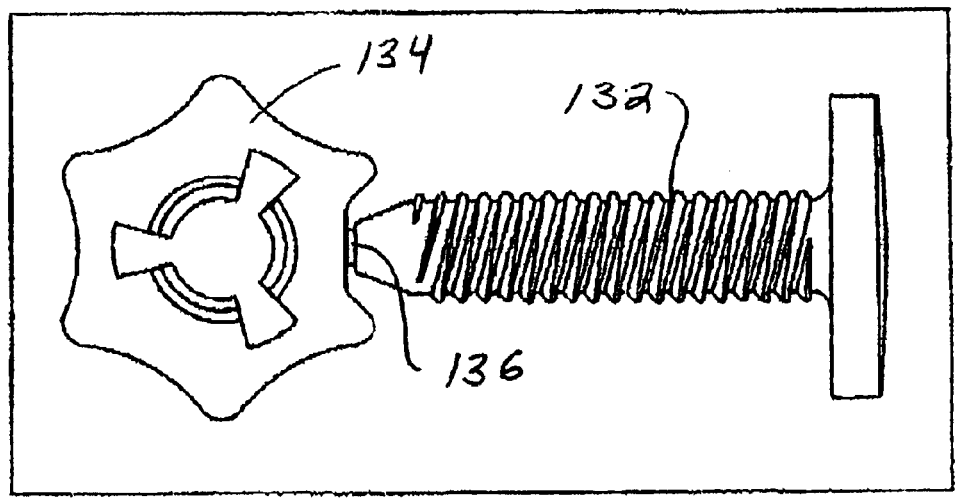
FIG. 5 is a plan view of a mold for making the ratcheting-type fastener shown in FIG. 2.

FIG. 5 illustrates a mold 130 for manufacturing fastener 10. Mold 130 includes a bolt mold cavity 132 and a nut mold cavity 134 interconnected by a frangible link cavity 136. A top mold portion (not shown) is provided, as those skilled in the art will understand readily. The mold is closed, and plastic is injected therein to fill cavities 132, 134 and 136.

Nut 14 is fastened to bolt 12 by placing distal end 20 in axial bore 56, either by moving bolt 12 into engagement with nut 14, or by moving nut 14 into engagement with bolt 12. Relative axial force applied to bolt 12, nut 14, or both causes nut 14 to slide upwardly on shank 16, from distal end 20 toward head end 18. As each thread segment 60, 62 and 64 encounters a thread 26, 28 or 30, each thread segment 60, 62 and 64 is permitted to deflect downwardly, i.e., away from the substantially horizontal position shown and toward axial end 54. Undercuts 90, 92 and 94 allow controlled deflection along connection strips 100, 102 and 104. Thus, even without turning either bolt 12 or nut 14, nut 14 can be moved along shank 16 until components provided between head 22 and axial end 52 of nut body 50 are securely wedged therebetween. Connection strips 100, 102 and 104 provide localization of the deflection behind thread segment faces 80, 82 and 84, and thereby minimize the potential for damage to bolt threads 26, 28 or 30 and to nut thread segments 60, 62 or 64.

To remove nut 14 from bolt 12, either bolt 12, nut 14, or both are rotated, thus causing thread segments 60, 62 and 64 to unscrew from threads 26, 28 and 30, and to thereby move nut body 50 away from head 22 of bolt 12. Because three separate independent threads are provided on shank 16, each can be provided with a steep thread pitch such that only a few rotations relatively between bolt 12 and nut 14 causes nut 14 to unscrew from a substantial length or portion of shank 16. However, since threads 26, 28 and 30 are alternatingly spiraled along shank 16, the cumulative effect is similar to a low pitch angle thread provided on shank 16. Thus, the advantages of a low thread angle are combined with the advantages of a steep thread angle in the same device.

Molding bolt 12 and nut 14 out of the same material, together with a frangible link 120 provided therebetween, results in a nut 14 attached to a respective bolt 12, thereby allowing shipment with sufficient nuts provided for all bolts 12. However, just prior to actual use, a slight twisting or tearing motion between bolt 12 and nut 14 results in breaking of frangible link 120, thereby allowing relative separation between bolt 12 and nut 14, and use thereof as described above.

Advantageously, even if cross-threading occurs between bolt 12 and nut 14, the condition can be remedied by grasping each firmly, and twisting bolt 12 to a substantially orthogonal position relative to nut 14. A slight relative rotation between bolt 12 and nut 14 generally results in realignment of threads 26, 28 and 30 with thread segments 60, 62 and 64. Thus, cross-threading is easily and quickly remedied with the present invention, as a result of the plurality of thread-starts on bolt 12 and nut 14, and the short thread segments in nut 14.

Further, controlled deflection of thread segments 60, 62 and 64 provided by undercuts 90, 92 and 94 in conjunction with thinned connection strips 100, 102 and 104 generally results in controlled deflection of thread faces 80, 82 and 84 such that push-on force is reduced. As a result of the direction of the undercut, and the shape of the undercut together with the wedging action of thread segments 60, 62 and 64 in threads 26, 28 and 30, pull of resistance is not reduced significantly. Further, the incidence of thread breakage or stripping is substantially reduced as a result of the toleration of deflection during push-on.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A ratcheting fastener system comprising:

a bolt having a shank, said shank having a head end and a distal end, a head on said shank at said head end, and a plurality of bolt threads on said shank, each said thread having a thread start at said distal end; and a nut having a nut body defining first and second axial ends, and a bore extending therethrough, said bore having a plurality of preformed, single layer, helical threads adapted for engaging said bolt threads when axial force is applied to said bolt with said distal end inserted in said nut, said plurality of threads including a plurality of thread segment corresponding to the number of threads on said bolt and equally spaced about said bore, each said thread segment extending a distance that is less than a circumference of said bore, said thread segments each having first and second thread segment ends, each said thread segment end being spaced from an adjacent thread segment end of an adjacent thread segment in a circumferential direction of said bore, each said thread segment being joined to said bore by a connection strip extending from and substantially coplanar with said first end of said nut body, each said connection strip having a thickness in the axial direction of said nut less than a thickness of said thread segments in the axial direction of said nut, each said thread segment having a single thread face that extends between the respective first and second thread segment ends and an undercut behind said thread face and below said associated connection strip for providing controlled deflection of said thread face, each thread face including a thread face first end positioned near said first end of said nut body and a thread face second end positioned farther away from said first end of said nut body as compared to said thread face first end, such that the thread face first end of each thread segment is located adjacent to said thread face second end of the adjacent thread segment.

2. The ratcheting fastener system of claim 1, said plurality of bolt threads including three threads, and said plurality of nut threads including three thread segments equally spaced about said bore.

3. The ratcheting fastener system of claim 1, said nut joined to said bolt by a frangible link connected to said bolt distal end and said nut.

4. The ratcheting fastener system of claim 1, said bolt and said nut being plastic.

5. The ratcheting fastener system of claim 4, said nut joined to said bolt by a frangible length connected to said bolt distal end and said nut.

6. The ratcheting fastener system of claim 1, said nut body having a scalloped outer surface.

* * * * *